3,530,130
1-ACYLATED-6-METHOXYPHENAZINE 5,
10-DIOXIDES
Willy Leimgruber, Montclair, and Manfred Weigele,
Cedar Grove, N.J., assignors to Hoffmann-La Roche
Inc., Nutley, N.J., a corporation of New Jersey
No Drawing. Filed Sept. 14, 1967, Ser. No. 667,653
Int. Cl. C07d 51/80
U.S. Cl. 260—287                                    2 Claims

ABSTRACT OF THE DISCLOSURE

Anti - bacterial 1 - acetoxy - 6 - methoxyphenazine 5,10 - dioxide and 1 - benzoyloxy - 6 - methoxyphenazine 5,10 - dioxide are prepared by reacting 1 - hydroxy-6-methoxyphenazine 5,10 - dioxide with acetic anhydride and benzoyl chloride respectively.

BACKGROUND OF THE INVENTION 1-hydroxy - 6 - methoxyphenazine 5,10 - dioxide is a known compound having antibacterial properties [Weigele et al., Tetrahedron Letters, 716 (1967)]. The compound is relatively insoluble and has a deep red color which present obstacles to the use of the compound as an anti-bacterial. Derivatives of 1-hydroxy-6-methoxyphenazine 5,10-dioxide having improved solubility and color characteristics without loss of antibacterial activity are highly desirable. Suitable derivatives of 1-hydroxy-6-methoxyphenazine 5,10-dioxide might be prepared by esterifying the hydroxy group. It is known however, that reactions of aromatic amine oxides with carboxylic acid anhydrides or acyl halides causes loss of the N-oxide (Tetrahedron Letters No. 4, pp. 237–241, 1965). In view of the prior art teachings, the preparation of esters of 1-hydroxy-6-methoxyphenazine-N,N-dioxide by the ordinary esterification techniques such as, treatment with acid anhydride or acid halide, would be expected to result in the loss of one or both oxides. It has, now been found, in contrast to the teachings of the prior art, that although deoxygenation cannot be completely excluded in the case of acetic anhydride and benzoyl halide, the desired esters of 1-hydroxy-6-methoxyphenazine 5,10-dioxide can be obtained.

SUMMARY OF THE INVENTION

This invention relates to 1-acetoxy-6-methoxyphenazine 5,10 - dioxide and 1 - benzoyloxy - 6 - methoxyphenazine 5,10 - dioxide and to compositions thereof and processes for inhibiting the growth of microorganisms such as bacteria, fungi, protozoa, algae and the like.

DETAILED DESCRIPTION OF THE INVENTION

The novel 1 - acetoxy - 6 - methoxyphenazine 5,10-dioxide of this invention is prepared by reacting 1-hydroxy-6-methoxyphenazine 5,10-dioxide with acetic anhydride at room temperature in the presence of an organic base. The organic base can be employed as solvent or it can be employed in admixture with other suitable solvents. Suitable organic bases are for example the organic amines, such as pyridine, triethylamine and the like. Other solvents such as for example, halogenated hydrocarbon, e.g., methylene chloride, chloroform, etc. can if desired be used in conjunction with the organic base. The reaction is preferably carried out at about room temperature though higher or lower temperatures, e.g., temperatures between about 0° C. and about 40° C. can also be employed. The reaction product is a mixture from which the desired 1 - acetoxy - 6 - methoxyphenazine 5,10-dioxide can be separated by conventional techniques, such as column chromatography.

The novel 1 - benzoyloxy - 6 - methoxyphenazine 5,10 - dioxide is prepared by reacting 1-hydroxy - 6 - methoxyphenazine - N,N - dioxide with a benzoyl halide, preferably benzoyl chloride, in the presence of an organic base. Suitable bases which can also be employed as solvent for the reaction, are the organic amines such as, triethylamine, pyridine and the like. If desired, the organic base can be utilized as the only solvent atlhough other compatible solvents such as for example, halogenated hydrocarbon, e.g., methylene chloride, chloroform, etc. can also be employed. The reaction temperature is not critical though it is preferred to operate at about room temperature, preferably at a temperature between about 0° C. and about 40° C. The reaction product is ordinarily obtained as a mixture, from which the desired end product must be separated. The desired product can be separated by such techniques as column chromatography, preparative thin layer chromatography and the like.

The novel compounds of this invention as indicated hereinabove are useful as anti-bacterial agents. More particularly, these compounds have been found to possess a high degree of anti-bacterial activity in vitro as determined by standard biological evaluation procedures. These compounds have been found to be active against a variety of gram positive and gram negative bacteria, as well as against mycobacterium and fungus. The activity against representative species of bacteria and fungi are shown in the following table.

IN VITRO ANTIMICROBIAL ACTIVITIES

| | Diameter of inhibition zones in mm. Concentration of active substance in mcg./ml. | | | | | |
|---|---|---|---|---|---|---|
| | 1-acetoxy-6-methoxy-phenazine 5,10-dioxide | | | 1-benzoyloxy-6-methoxyphenazine 5,10-dioxide | | |
| Organism | 100 | 10 | 1 | 100 | 10 | 1 |
| B. subtilis 558 | | 23 | 14 | | 19.5 | 14 |
| E. coli 94 | 25 | 15 | | 0 | 0 | |
| M. Phlei 78 | | 12 | 0 | 18 | 11 | |
| S. aureus 82 | 27 | 18 | | 20 | 14 | |
| Ps. aeruginosa 56 | 18 | 0 | | 0 | 0 | |
| C. albicans 155 | 24 | 14 | | 0 | 0 | |
| P. varioti M-16 | | 24 | 0 | 10 | 0 | |

The novel compounds of this invention have also been shown to possess in vivo activity by tests in warm blooded animals. For example, 1 - acetoxy - 6 - methoxyphenazine 5,10-dioxide which shown no toxic effects when administered subcutaneously to mice in single doses up to 25 mg./kg. is active against streptococcus agalactiae at 0.16 mcg./ml. S.C. in mice, against Staphylococcus aureus at 0.8 mcg./ml. S.C. in mice, against Escherichia coli at 12 mcg./ml. S.C. in mice and against Pseudomonas aeruginosa at 100 mcg./ml. S.C. in mice.

The chemical and biological properties of this invention make them particularly suitable for use in pharmaceutical preparations for the treatment of pathogenic, bacterial and fungal infections in warm blooded animals as well as for antimicrobial industrial applications. They can for example, be used as mildew proofing agents in preventing microbial deterioration of such organic materials as textiles, paper, wood, etc. They can be employed as paint additives to prevent against microbial deterioration of both the liquid and the applied forms of both oil and water base paints. As paint additives, they also render the coated surfaces resistant to microbial attack. They can be employed in surface finishings such as plaster, tile, brick and other organic building materials to inhibit the growth of microorganisms such as fungi and algae. They can be employed as sanitizing agents or as anti-mycotic agents, as additives for soap or other organic materials, such as, foodstuffs or for applications to wrappers or coatings for soaps, foodstuffs and the like.

EXAMPLE 1

Preparation of 1-acetoxy-6-methoxyphenazine 5,10-dioxide 1-hydroxy-6-methoxyphenazine 5,10-dioxide (2 g.) was suspended in a mixture of 32 ml. of acetic anhydride and 10 ml. of pyridine. The suspension was stirred at room temperature for 113 hours. The reaction mixture was diluted with 400 ml. of ether. The solids were collected by filtration, washed with a little ether, dissolved in the minimum amount of chloroform and chromatographed on 150 g. of Silica Gel with chloroform as solvent. After some starting material had been eluted, fractions were collected containing the desired 1-acetoxy-6-methoxyphenazine 5,10-dioxide. The material was obtained in pure form after evaporation of the solvent from the fractions and recrystallization of the solid from acetone. The 1-acetoxy-6-methoxyphenazine 5,10-dioxide product was obtained as orange crystals, M.P. 162° dec.; infrared absorption at 1775 cm.$^{-1}$.

EXAMPLE 2

Preparation of 1-benzoyloxy-6-methoxyphenazine 5,10-dioxide

To a solution of 100 mg. of 1-hydroxy-6-methoxyphenazine 5,10-dioxide in 2 ml. of chloroform and 0.5 ml. of triethylamine there was added dropwise with stirring 0.1 ml. of benzoyl chloride in 1 ml. of chloroform. Stirring was continued at room temperature for 3 hours. The reaction solution was then streaked on preparative thin layer chromatography plates (1 mm. Silica Gel) and the plates were developed in ethyl acetate. The zones containing the desired product ($Rf=0.35$) were scraped off and eluted with a mixture of chloroform/acetone (2:1). On concentrating the eluate, 1-benzoyloxy-6-methoxyphenazine 5,10-dioxide was obtained as orange crystals, M.P. 166° dec.; infrared absorption at 1745 cm.$^{-1}$.

What is claimed is:
1. 1-acetoxy-6-methoxyphenazine 5,10-dioxide.
2. 1-benzoyloxy-6-methoxyphenazine 5,10-dioxide.

References Cited

UNITED STATES PATENTS 2,813,868  11/1957  Konig _____ 260—267

FOREIGN PATENTS 1,090,899  11/1967  Great Britain.
784,213  4/1968  Canada.

DONALD G. DAUS, Primary Examiner

U.S. Cl. X.R.

424—250